United States Patent
Tschida

Patent Number: 5,921,642
Date of Patent: Jul. 13, 1999

[54] SNOWMOBILE STUD RETAINER

[76] Inventor: Kelly Tschida, 13414 Lexington Ave. NE., Ham Lake, Minn. 55304-7313

[21] Appl. No.: 08/907,993

[22] Filed: Aug. 11, 1997

[51] Int. Cl.[6] .................................................. B62D 55/28
[52] U.S. Cl. ........................................ 305/180; 305/162
[58] Field of Search ................................. 305/160, 161, 305/162, 165, 180, 191, 192

[56] References Cited

U.S. PATENT DOCUMENTS

| | | | |
|---|---|---|---|
| 3,785,420 | 1/1974 | Bradley et al. | 305/180 X |
| 3,973,808 | 8/1976 | Jaussen et al. | 305/180 |
| 4,938,546 | 7/1990 | Simmons | 305/180 |
| 5,641,214 | 6/1997 | Kafka | 305/180 |
| 5,676,437 | 10/1997 | Holmgren et al. | 305/180 |
| 5,690,398 | 11/1997 | Pribyl | 305/180 X |

*Primary Examiner*—Russell D. Stormer
*Attorney, Agent, or Firm*—D L Tschida

[57] ABSTRACT

A molded plastic retainer for supporting a spiked vehicle stud. In a construction useable with snowmobile studs, a ground engaging surface includes a self threading center bore and concentrically disposed to which are a raised, hexagon tool surface and a number of pointed secondary, traction enhancing studs. A track engaging surface of the retainer includes a tapered recess concentric to the stud receiving bore and a number of projections which enhance the grip between the retainer and track without squeeze out or tearing. Alternative configurations and mounting arrangements of the secondary studs and gripping projections are disclosed and some of which provide multi-faceted surfaces.

22 Claims, 6 Drawing Sheets

SNOWMOBILE STUD RETAINER

BACKGROUND OF THE INVENTION

The present invention relates to studded snowmobile tracks and, in particular, to a self-threading retainer having an exposed surface which contains a number of raised, secondary studs which project adjacent a primary stud. The secondary studs enhance track traction and may be used with or without the primary stud. A track engaging surface of the retainer includes a number of raised surfaces disposed adjacent a tapered recess to secure the retainer to a track without squeeze out or tearing.

A variety of studs and threaded stud retainers have been developed for snowmobile tracks. Examples of some early studs, which are attached with rivets and which have multiple, pointed gripping surfaces are shown at U.S. Pat. No. 3,572,851 and Des. Pat. No. 238,764.

A more typical, present day assembly provides a metal stud which includes a threaded shank and a pointed end that is shaped to promote traction and the gripping of a preferred terrain (e.g. snow or ice). Some of these studs provide a shank that mounts through a hole in the track and is fastened to a base plate on the opposite side of the track. Other studs provide an integral flanged base which mounts on the inside of the track and a terrain engaging end that mounts on the outside of the track. A threaded fastener (e.g. a nut and washer or other threaded retainer) mates with a threaded portion of the shank to secure the stud to the track. The exposed tip and edges of the shank can be formed to a preferred gripping shape or a separate formed tip can be attached to the shank. A washer with grip enhancing surfaces might also be secured to the stud shank. Examples of various known stud and retainer constructions are shown at U.S. Pat. Nos. 4,758,055; 5,188,441; 5,234,266; and 5,573,316.

U.S. Pat. No. 5,299,860 also discloses a molded plastic retainer that can be used to secure a threaded stud to a track. The retainer is used with studs having a flanged base and which base includes a hexagon shaped recess which receives an Allen wrench. An exposed surface of the retainer includes a raised hexagon surface which accepts a socket or wrench to facilitate retainer mounting.

Nowhere does the art disclose a retainer having separate gripping surfaces which promote the gripping of a supported stud with the terrain and retention of the retainer to the track. The present invention therefore provides a self-threading molded plastic retainer having spiked or raised, secondary surfaces which enhance gripping of the terrain. A track engaging surface of the retainer also includes a number of projections and recesses which promote the retention of the retainer to the track without damaging the track.

SUMMARY OF THE INVENTION

It is a primary object of the invention to provide a molded plastic retainer for securing a primary stud to a vehicle track.

It is a further object of the invention to provide a self-threading retainer having a terrain engaging surface shaped to enhance traction.

It is a further object of the invention to provide a self-threading retainer having a terrain engaging surface with includes a plurality of secondary studs that mount adjacent a primary stud; for example, a number of conical, arcuate, ridged or multi-faceted studs that are arrayed adjacent the primary stud.

It is a further object of the invention to provide a self-threading retainer having a surface shaped to grip the track without tearing or squeeze out of the track.

It is a further object of the invention to provide a retainer having a track engaging surface which includes a number of raised projections, for example, a number of hemispherical and multi-faceted bumps, arrayed around a tapered bore, which supports the primary stud.

Various of the foregoing objects, advantages and distinctions of the invention are obtained in a presently preferred molded retainer. One presently preferred construction provides a molded plastic body having a terrain engaging surface which includes a number of traction enhancing, multi-faceted secondary studs. A track contacting surface includes a number of raised projections which enhance gripping without tearing the track or causing squeeze-out. Molded in concentric registry to a self-threading center bore are a tapered recessed cavity and a raised hexagon tool gripping surface.

Alternative constructions are disclosed to retainers having different arrangements of secondary studs. Exemplary conical, faceted and cupped secondary studs are shown. Alternative constructions and arrangements of track gripping projections are also disclosed.

Still other objects, advantages and distinctions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
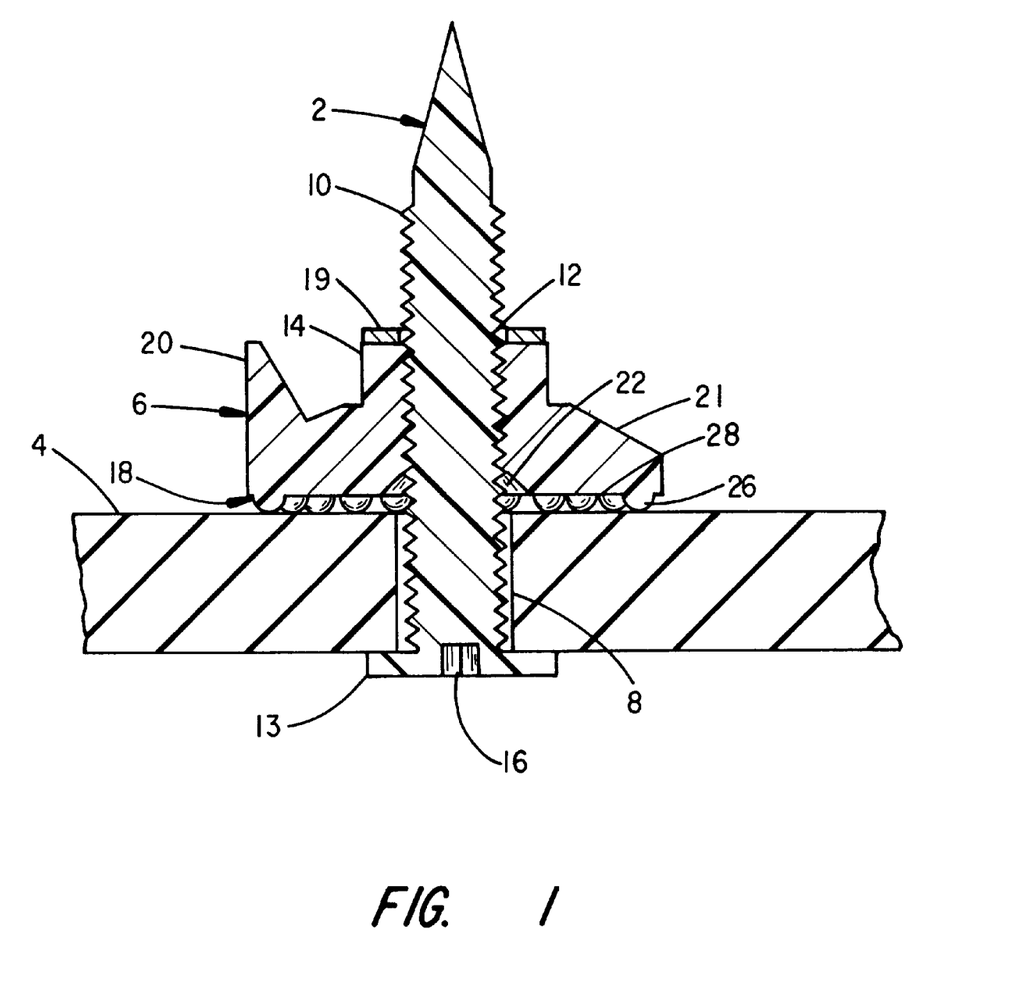
FIG. 1 is a cross section drawing through a traction stud and retainer of the invention at a typical vehicle track

Referring to FIG. 1, a cross section drawing is shown through a typical traction stud 2 which is secured to a vehicle track 4, for example, a snowmobile track. A molded retainer 6 of the invention secures the stud 2 to the track 4. The retainer 6 provides an improved construction which promotes traction between the track 4 and terrain and adhesion between the retainer 6 and the track 4. Raised projections are particularly provided at exposed and track engaging surfaces to provide secondary traction and enhance retention of the retainer to the track.

Varieties of studs and cleats have been mounted to a variety of tire and track surfaces to promote vehicle traction. Most studs, such as the stud 2, include pointed tips of a preferred shape to bite into and grip an intended terrain. The stud 2 includes a threaded shank surface 10 which mounts through a prepared hole 8 in the track 4. The hole 8 is sized to closely match the diameter of the shank and may be slightly undersized, such that the stud has to be screwed through the hole 8. The surface 10 mates with a bore 12 in the retainer 6 and the retainer 6 secures the stud 2 to the track 4. A flared stud head 13 cooperates with the retainer 6 to displace the retention forces and secure the stud 2 to the track 4 without tear out or loosening of the retainer 6.

The bore 12 can be smooth or threaded. A smooth, self-threading bore 12 is presently provided. The diameter of the bore (e.g. 7 mm or 5/16 inch) is sized and the material of the retainer 6 is selected (e.g. nylon, nylon composites or a variety of plastics and plastic composites), such that the primary stud 2 self threads itself to the retainer 6. Alternatively, the bore 12 can be pre-threaded. The retainer material is selected to provide durability relative to the terrain and prevent stripping of the cut threads with stud movement. A lock washer type of fastening is thereby also obtained.

A raised, hexagon tool surface 14 concentrically surrounds the bore 12 and permits holding the retainer 6 with a socket or nut driver as the stud 2 is secured to the track 4. A hexagon recess 16 is provided at the stud head 13, which accepts an Allen wrench. Alternatively, the retainer 6 and/or head 13 might include flat side wall surfaces which accept a separate wrench or socket.

The stud 2 is secured by rotating the stud 2 and drawing the retainer 6 into compression with the track 4. An annular, raised bottom retainer surface 18 grips the track 4. The surface 18 is presently defined by a number of projections which are discussed at FIGS. 3 and 8–10. A raised annular surface 19, which can exhibit a variety of alternative shapes, might also be provided at the tool surface 14 to serve as a washer for possible pointed caps (not shown) which might be fitted to the shank of a primary stud that is constructed to accept same.

Figure 2:
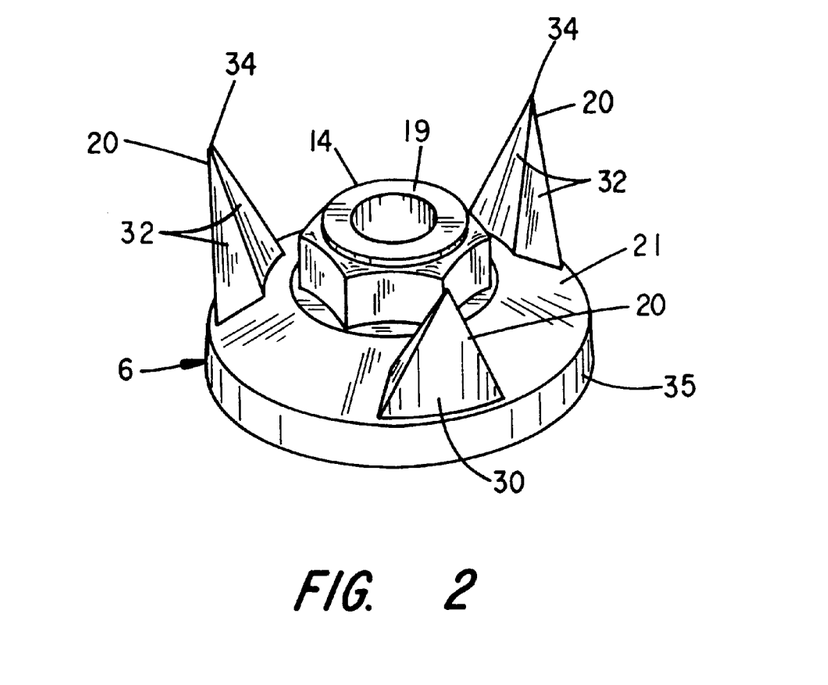
FIG. 2 is a perspective drawing to an exposed, terrain engaging surface of the retainer of FIG. 2.
Figure 3:
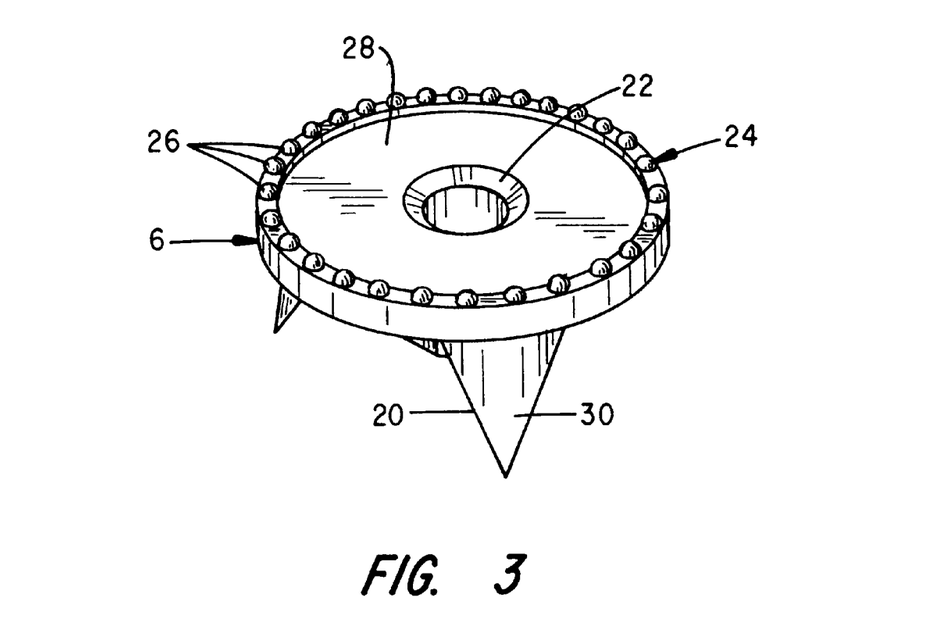
FIG. 3 is a perspective drawing to a track engaging surface of a molded, self-threading plastic retainer of the invention.
Figure 4:
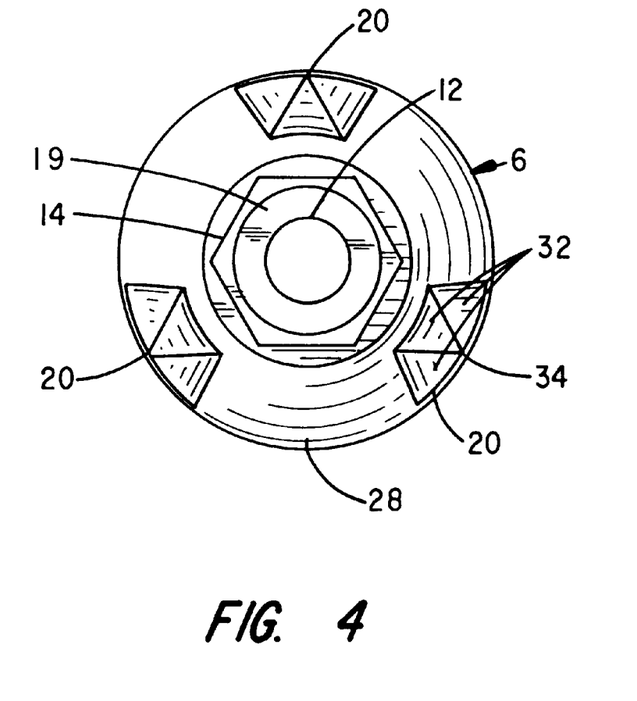
FIG. 4 is a top plan view of the terrain engaging surface of the retainer of FIG. 3.

With additional attention to FIGS. 2 through 4, the retainer 6 is constructed to provide a number of enhancements which promote traction between the track and terrain and retention between the retainer 6 and the track 4. Traction is enhanced with a number of secondary studs 20 that are concentrically arrayed around the central bore 12 and project from an exposed upper surface 21. Track retention is enhanced with a tapered recess 22 at the bore 12 and an annular arrangement of raised projections 26 which extend from a bottom surface 28 of the retainer 6, see also FIG. 3.

The secondary studs 20 are presently configured to project either 0.75 or 0.95 inches above the surface 21; although the length of the secondary studs 20 can be varied as desired.

Each stud 20 provides an arcuate surface 30 and a number of flat, faceted surfaces 32 which taper to a common point 34, and which generally define a pyramidal shape. The surface 30 can be common to or project adjacent the peripheral side wall 35 of the retainer 6. The surface 30 may also be flat, taper inward or splay outward as desired.

The secondary studs 20 are displaced equally around the retainer 6 and concentric to the bore 12 and primary stud 2. The positioning of the studs 20 can, however, be varied as desired over the surface 21. The studs 20 promote traction by providing additional gripping points 34 to penetrate the terrain and increase the terrain contacting surface area at the facets 32. Three secondary studs 20 are presently provided, although more might be included. Three secondary studs 20 have been found to enhance traction without any undue collection of materials from the terrain and clogging of the retainer 6. For example, snow and ice can buildup in the space between the primary stud 2 and secondary studs 20 and the collection of which can defeat the advantages of the secondary studs 20.

Although the retainer 6 is constructed of a relatively soft material compared to the primary stud 2, the secondary studs 20 have not been found to appreciably wear down before normal replacement of the studs 2. While, too, the retainer 6 is normally used in cooperation with a stud 2 that extends appreciably above the surface 21, the studs 20 might be used alone or with short studs 2 to provide primary traction, such as with turf, asphalt or gravel surfaces.

Figure 5:
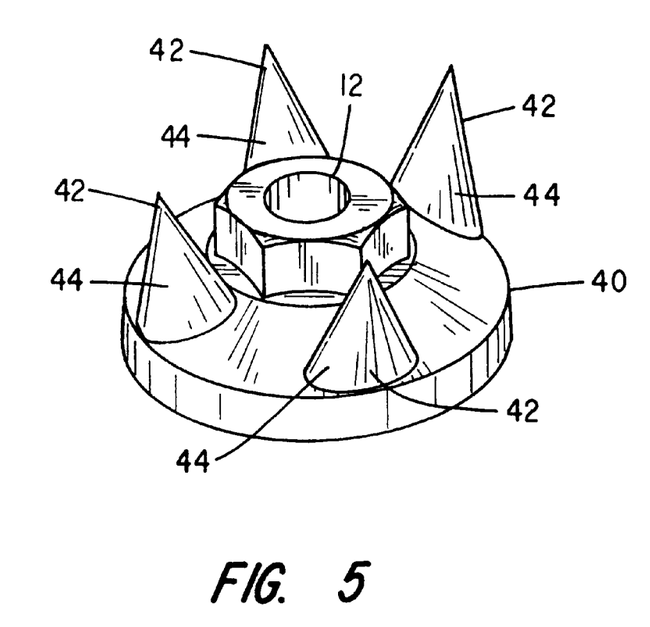
FIG. 5 is a perspective drawing showing a terrain engaging surface of a retainer having a number of conical secondary studs concentrically arrayed around a primary stud bore.
Figure 6:
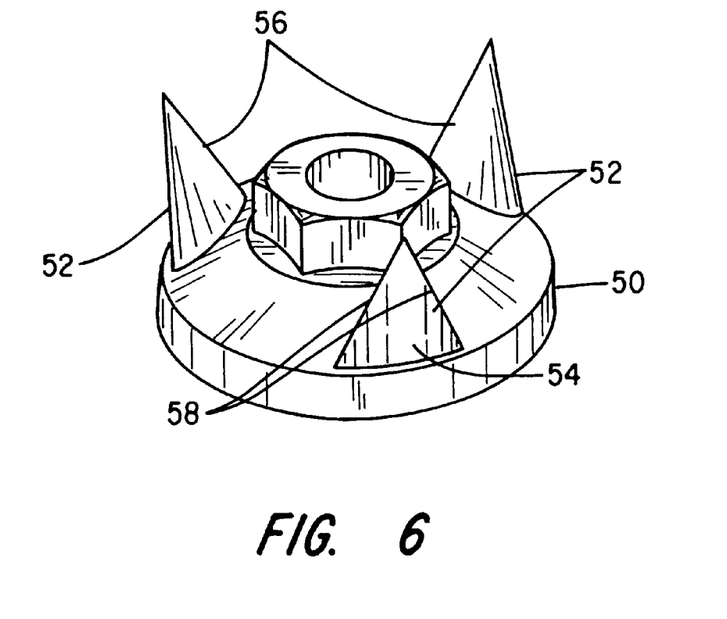
FIG. 6 is a perspective drawing showing a terrain engaging surface of a retainer having a number of semi-conical, faceted secondary studs arrayed around a primary stud bore.
Figure 7:
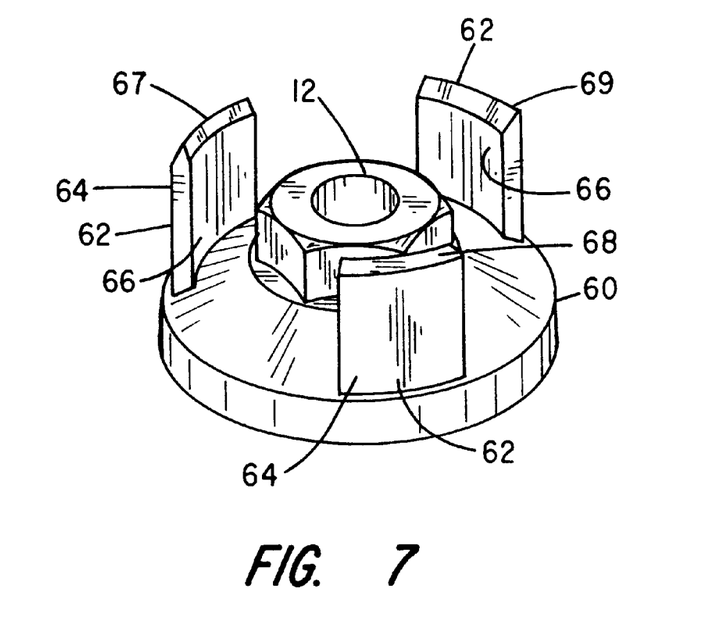
FIG. 7 is a perspective drawing showing a terrain engaging surface of a retainer having a number of arcuate or cupped secondary studs arrayed around the primary stud bore and one of which studs provides an exemplary beveled edge.

With additional attention directed to FIGS. 5, 6 and 7, perspective drawings are shown to alternative retainers 40, 50 and 60. The retainers 40 and 50 are essentially identical to the retainer 6, except the retainer 40 provides four conical shaped secondary studs 42. The studs 42 are equally and concentrically displaced about the bore 12. Each stud 42 provides a tapered surface 44 that projects to a point. The contour of the surface 44, however, may be varied at different regions of the periphery.

A variation of the conical secondary studs 42 are shown at the retainer 50 of FIG. 6 and wherein three secondary studs 52 include an arcuate outer surface 54 and a smooth radiused, tapered inner surface 56 that extends between edges 58 with the surface 54.

FIG. 7 shows yet another retainer 60 having three vertically arcuate secondary studs 62. Outer and inner surfaces 64 and 66 rise substantially parallel to each other to a tip 68. The tip 68 is depicted as flat, although exemplary wedge and bevel tips 67 and 69 might alternatively be provided. The studs 62 provide larger surface areas at the surfaces is 64 and 66 and from which enhanced traction forces are obtained, however, loose material from the terrain can collect between the primary stud 2 and the secondary studs 62, and effectively clog the secondary studs 62 and negate any benefit of additional traction. Limiting the numbers of secondary studs 62 and possibly tapering one or both of the surfaces 64 or 66 of the secondary studs in the fashion of the secondary studs 20, 42 and 52 might be used to alleviate clogging and without effecting the retainer traction or incurring undue wear at the secondary studs.

Although a number of alternative secondary studs 20, 42, 52 and 62 have been shown and described, it is to be appreciated secondary studs of still other configurations might be constructed. For example, any number of facets can be provided at either of the inner or outer projecting surfaces of the secondary studs 20, 42, 52 and 62 and the points can be flat or provide defined edges. The secondary studs may also be arrayed in other than concentric relation to the bore 12, for example, randomly distributed over the exposed surface 21 or with a defined registration to each other.

Figure 8:
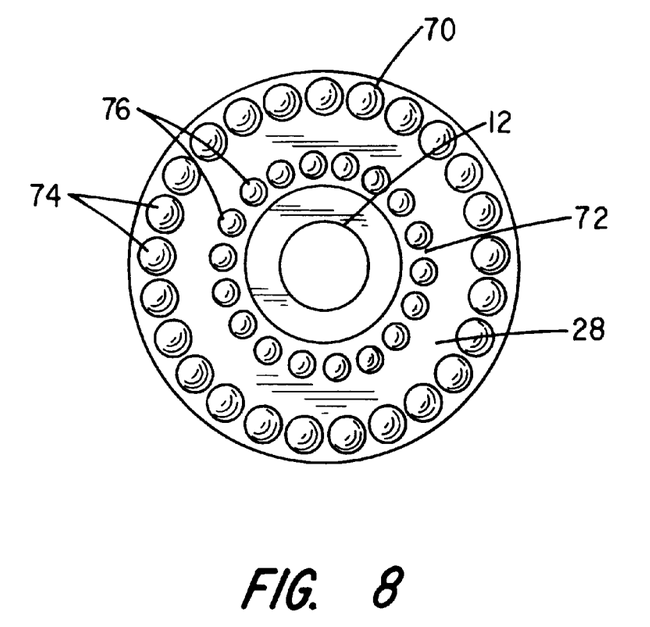
FIG. 8 is a bottom plan view to a track engaging surface of a retainer having a number of hemispherical projections of differing sizes, concentrically arrayed around a tapered recess which receives the primary stud.
Figure 9:
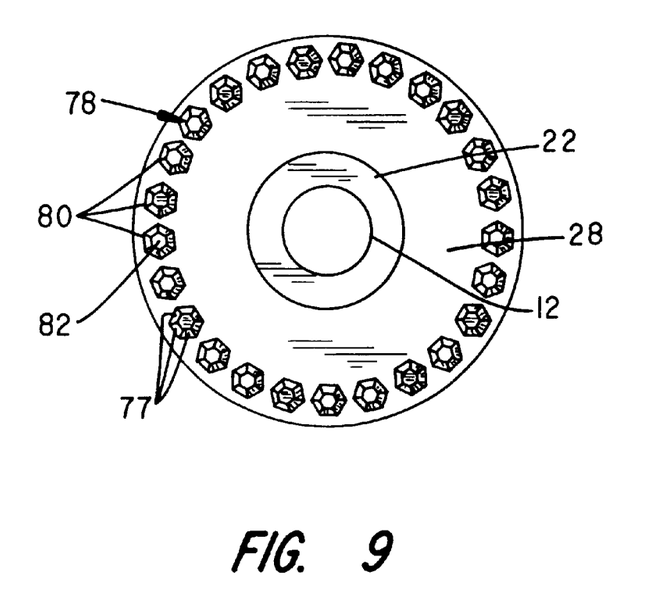
FIG. 9 is a bottom plan view to a track engaging surface of a retainer having a number of seven facet projections concentrically arrayed around a tapered recess which receives a primary stud.
Figure 10:
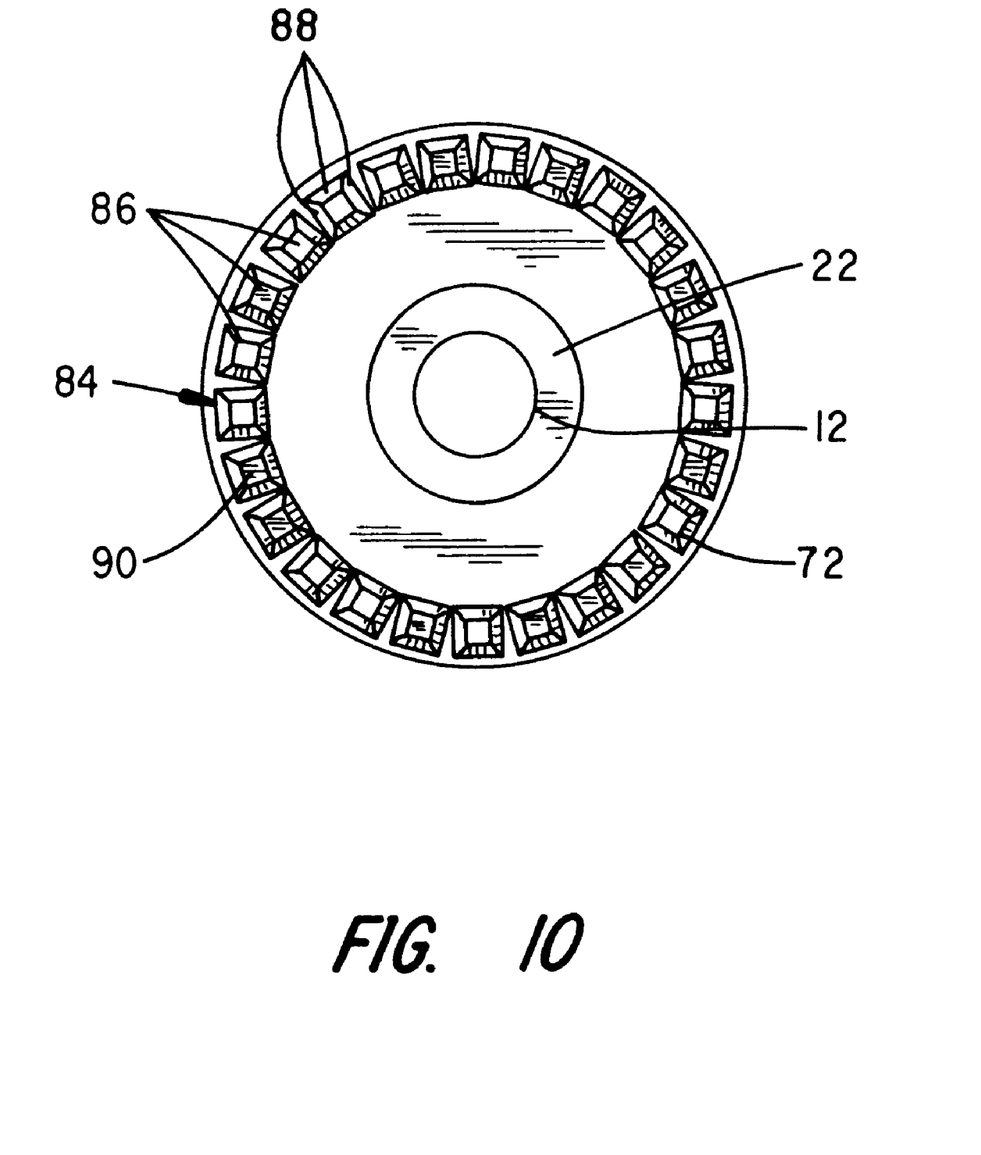
FIG. 10 is a perspective drawing to a track engaging surface of a retainer having a number of five facet projections concentrically arrayed around a tapered recess which receives the primary stud.

Returning attention to FIG. 3, a view is shown to the bottom or track engaging surface 28 of the retainer 6. FIGS. 8, 9 and 10 show alternative constructions of the retainer bottom. Preferably, the bottom surface of the retainer should grip the track 4 and distribute the compression forces between the stud head 14 and retainer 6 over a large area. The retainer 6 should also compress into the track 4 to prevent rotation and possible loosening or dislocation of the retainer 6 and stud 2. Premature tear out of a primary stud 2 or tearing of the track 4 can thereby also be avoided.

The foregoing attributes are obtained in the retainer 6 with a number of hemispherical bumps 24, which are combined with the tapered recess 22. The annular ring of bumps 26 not only compress into the track 4, but the track 4 expands into the recess 22 and between the bumps 26, as the head 14 is drawn against the track 4. An increased holding area is thereby obtained versus that provided by a raised solid annular ring. The size and spacing between the bumps 26 are adjusted to allow the track to fill the voids and the exposed smooth surface of the bumps 26 prevents tearing at the track 4.

FIGS. 8, 9 and 10 show alternative arrangements of track gripping projections which might be included at the bottom of a stud retainer. FIG. 8 provides two concentric, rings 70 and 72 of hemispherical bumps 74 and 76. The bumps 74 and 76 are of differing sizes, although can be sized the same and the spacing between the bumps 74 and 76 in each ring 70 and 72 can be varied. Alternatively, the bumps 74 and 76 can be randomly distributed over the bottom surface adjacent the recess 22 and bore 12.

FIG. 9 depicts another ring arrangement 78 of multi-faceted bumps 80 having flat tips or ends 82. The bumps 80 provide numerous edges between the facets 77 to promote gripping and the flattened tips 82 insure the track fibers are not cut as the retainer is compressed to the track 4. FIG. 10 depicts another ring arrangement 84 of pyramidal bumps 86 having numerous facets 88 and flattened tips 90. The faceted configurations and geometry's of the facets 77 and 88 provides differing spacings between the bumps 80 and 86, which also promotes the compression of the bumps into the track 4 and retention of the retainer without rotating during the tightening of the stud 2 or normal track operation. It is to be appreciated still other bump configurations, distributions and spacings can be accommodated at a stud retainer to facilitate stud retention without tearing or abrading the track 4.

While the invention has been described with respect to a preferred and alternative constructions, still other constructions may be suggested to those skilled in the art. The foregoing description should therefore be construed to include all those embodiments within the spirit and scope of the following claims.

What is claimed is:

1. A traction stud and retainer assembly comprising:
   a) a traction stud and a retainer body having a terrain engaging surface that includes a tool surface having a bore from which said traction stud projects and a plurality of raised secondary studs displaced from said tool surface, wherein said traction stud and said secondary studs are shaped to penetrate and grip the terrain; and
   b) wherein a track engaging surface of said retainer body includes a plurality of raised gripper projections, whereby the gripper projections compress into a vehicle track and the track expands around the projections to secure the retainer body to the track.

2. A retainer as set forth in claim 1 wherein said plurality of secondary studs each include a plurality of facets which extend to a common apex.

3. A retainer as set forth in claim 2 wherein said secondary studs exhibit a pyramidal shape.

4. A retainer as set forth in claim 1 wherein said secondary studs exhibit a conical shape.

5. A retainer as set forth in claim 1 including a tapered recess concentric to said bore.

6. A retainer as set forth in claim 1 wherein said secondary studs exhibit first and second arcuate walls which are displaced opposite one another.

7. A retainer as set forth in claim 1 wherein said bore includes a threaded surface.

8. A retainer as set forth in claim 1 wherein said plurality of gripper projections each exhibit a hemispherical shape.

9. A retainer as set forth in claim 1 wherein said gripper projections are arranged in at least one annular ring.

10. A retainer as set forth in claim 1 wherein said plurality of gripper projections each include a plurality of facets.

11. A retainer as set forth in claim 10 wherein said gripper projections each exhibit a pyramidal shape and the facets of which extend to a flat common apex.

12. A retainer as set forth in claim 1 wherein said gripper projections each exhibit a pyramidal shape.

13. A retainer as set forth in claim 1 wherein said retainer is molded from a nylon composite.

14. A retainer as set forth in claim 1 wherein said tool surface includes a raised washer surface.

15. A retainer for traction studs comprising:
   a) a retainer body having a terrain engaging surface which includes a bore adapted to receive a traction stud, a tool surface and a plurality of raised secondary studs displaced from said tool surface, wherein the secondary studs include a plurality of facets which project to a common apex and are shaped to penetrate and grip the terrain; and
   b) wherein a track engaging surface of said retainer body includes a plurality of raised gripper projections displaced about a tapered recess, whereby the gripper projections compress into a vehicle track and the track expands into the tapered recess and around the projections to secure the retainer to the track.

16. A retainer as set forth in claim 15 wherein said secondary studs exhibit a pyramidal shape.

17. A retainer as set forth in claim 15 wherein said gripper projections are arranged in at least one annular ring.

18. A retainer as set forth in claim 15 wherein said plurality of gripper projections each exhibit a hemispherical shape.

19. A retainer as set forth in claim 15 wherein said plurality of gripper projections each include a plurality of facets which extend to a flat common apex.

20. A retainer for traction studs comprising:
   a) a retainer body having a terrain engaging surface which includes a bore adapted to receive a traction stud, a raised hexagon tool surface concentric to said bore and a plurality of raised secondary studs displaced from said tool surface, wherein the secondary studs include a plurality of facets which are shaped to penetrate and grip the terrain; and b) wherein a track engaging surface of said retainer body includes a plurality of hemispherical projections arranged in an annular ring concentrically disposed about a tapered recess, whereby the gripper projections compress into a vehicle track and the track expands into said recess to prevent loosening of said retainer body upon securing a traction stud to said bore.

21. A retainer as set forth in claim 20 wherein said secondary studs exhibit a pyramidal shape.

22. A retainer as set forth in claim 20 wherein said plurality of secondary studs include a plurality of facets which extend to a common apex.

* * * * *